(12) United States Patent
Towers et al.

(10) Patent No.: US 10,102,773 B2
(45) Date of Patent: Oct. 16, 2018

(54) METHODS FOR EVALUATING HUMAN PERFORMANCE IN AVIATION

(71) Applicant: The Boeing Company, Chicago, IL (US)

(72) Inventors: John Towers, Brisbane (AU); Johann F. Thaheld, Kent, WA (US); Nathan C. Perry, Brisbane (AU)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 14/875,727

(22) Filed: Oct. 6, 2015

(65) Prior Publication Data

US 2016/0027336 A1    Jan. 28, 2016

Related U.S. Application Data

(63) Continuation-in-part of application No. 13/867,149, filed on Apr. 22, 2013, now abandoned.

(30) Foreign Application Priority Data

Apr. 23, 2012 (AU) ................................ 2012901601
Mar. 12, 2013 (AU) ................................ 2013201418

(51) Int. Cl.
*G09B 19/16* (2006.01)
*G09B 19/14* (2006.01)
(Continued)

(52) U.S. Cl.
CPC ....... *G09B 19/165* (2013.01); *G06K 9/00255* (2013.01); *G06K 9/00288* (2013.01);
(Continued)

(58) Field of Classification Search
CPC ........ A61B 3/113; A61B 2503/22; G09B 9/10
See application file for complete search history.

(56) References Cited

U.S. PATENT DOCUMENTS 4,979,137 A * 12/1990 Gerstenfeld ............ G01S 13/91
                                                          434/220
6,053,737 A    4/2000 Babbitt et al.
(Continued)

OTHER PUBLICATIONS

Kasarskis et al., "Comparison of Expert and Novice Scan Behaviors During VFR Flight", 11th Int'l Symposium on Aviation Psychology Columbus, OH: The Ohio State University, 2001.
(Continued)

*Primary Examiner* — Timothy A Musselman
(74) *Attorney, Agent, or Firm* — Ostrager Chong Flaherty & Broitman P.C.

(57) ABSTRACT

An aviation performance evaluation methodology that can be implemented in various ways depending on the applications of interest. Baseline standards for expected performance are stored in one or more databases. One database may contain performance parameters and another database may contain baseline standards such as expert gaze data. Real-time actual performance data is acquired using an eye tracker system comprising at least one video camera, at least one infrared light source, and a computer system which receives image data from the video camera(s). More specifically, the actual and expected performance data are input to a computer system that is programmed to analyze the actual performance based on a comparison of the actual and expected performance data. Based on the results of the comparative analysis, context-adjusted inferences can be made regarding performance, adopted strategies, gaze scan quality, alertness or distraction, situational awareness, and workload.

5 Claims, 9 Drawing Sheets

(51) Int. Cl.
*G06K 9/00* (2006.01)
*G09B 9/10* (2006.01)
*G09B 9/08* (2006.01)

(52) U.S. Cl.
CPC ............... *G09B 9/08* (2013.01); *G09B 9/10* (2013.01); *G09B 19/14* (2013.01)

(56) References Cited

U.S. PATENT DOCUMENTS

| | | | |
|---|---|---|---|
| 6,200,139 B1 | 3/2001 | Clapper | |
| 6,575,902 B1* | 6/2003 | Burton | A61B 5/18 340/575 |
| 7,142,971 B2 | 11/2006 | Brown et al. | |
| 8,982,046 B2 | 3/2015 | Edwards et al. | |
| 2006/0041345 A1* | 2/2006 | Metcalf | B64C 13/24 701/31.4 |
| 2007/0244606 A1* | 10/2007 | Zhang | B60T 8/17551 701/1 |
| 2010/0214411 A1* | 8/2010 | Weinmann | B64D 45/00 348/148 |
| 2011/0091847 A1 | 4/2011 | Carroll et al. | |
| 2011/0111384 A1* | 5/2011 | Dietrich | G09B 7/00 434/350 |
| 2011/0262887 A1 | 10/2011 | Cleveland | |
| 2013/0132522 A1* | 5/2013 | Ruppin | B64D 45/0015 709/219 |

OTHER PUBLICATIONS

Sarter et al., "Pilots' Monitoring Strategies and Performance on Automated Flight Decks: An Empirical Study Combining Behavioral and Eye-Tracking Data", Human Factors, vol. 49, No. 3 (Jun. 2007), pp. 347-357.

Weibel et al., "Let's look at the Cockpit: Exploring Mobile Eye-Tracking for Observational Research on the Flight Deck", Proceedings of the ETRA (Eye Tracking Research and Applications) 2012, Santa Barbara, CA, Mar. 28-30, 2012, pp. 107-114.

Australian Examination Report dated Apr. 29, 2014 in Australian Patent Application No. 2013201418 (Australian counterpart to the parent application of the instant CIP application).

* cited by examiner

METHODS FOR EVALUATING HUMAN PERFORMANCE IN AVIATION

RELATED PATENT APPLICATIONS

This application is a continuation-in-part of and claims the benefit of priority from U.S. patent application Ser. No. 13/867,149 filed on Apr. 22, 2013 (the disclosure of which is incorporated by reference herein in its entirety), which in turn claims the benefit of foreign priority from Australian Patent Application No. 2013201418 filed on Mar. 12, 2013 and Australian Provisional Patent Application No. 2012901601 filed on Apr. 23, 2012.

BACKGROUND

The present disclosure relates generally to systems and methods for monitoring the performance of airline pilots or air traffic management (ATM) operators.

Pilots are expected to adopt different strategies in response to different conditions within each phase of flight. Each strategy calls for specific patterns of visual attention when monitoring flight deck instruments during execution of the strategy. Similarly, air traffic management (ATM) operators are expected to employ specific patterns of visual attention when monitoring air traffic on display monitors (hereinafter "ATM consoles"). The ability of pilots and ATM operators to identify and visually scan high-priority information being displayed is fundamental to ensuring successful performance. In addition, aircraft pilots and ATM operators may be subjected to periods of high workload, stress and fatigue which may have a negative impact on performance.

There is a need for improvements in systems and methods for monitoring and evaluating the performance of pilots and ATM operators.

SUMMARY

The subject matter disclosed in detail below is directed to an aviation performance evaluation methodology that can be implemented in various ways depending on the applications of interest. Baseline standards for expected performance are stored in one or more databases. One database may contain performance parameters and another database may contain baseline standards such as expert gaze data. Real-time actual performance data is acquired using an eye tracker system comprising at least one video camera (hereinafter "camera"), at least two infrared light sources, and a computer system which receives image data from the video camera(s). More specifically, the actual and expected performance data are input to a computer system that is programmed to analyze the actual performance based on a comparison of the actual and expected performance data. Based on the results of the comparative analysis, context-adjusted inferences can be made regarding performance, adopted strategies, gaze scan quality, alertness or distraction, situational awareness, and workload. This aviation performance evaluation methodology can be used to monitor and assess the real-time actual performance data of pilots or ATM operators.

One aspect of the subject matter disclosed in detail below is a method for recording pilot performance during operation of an aircraft, comprising: using an eye tracker device, monitoring a pilot's gaze during operation of the aircraft; detecting a gaze location where the pilot's gaze intersects an instrument panel or a flight deck window of the aircraft during operation of the aircraft; and storing gaze location data in a data storage device onboard the aircraft during operation of the aircraft. The data storage device may be a flight data recorder. The method may further comprise: retrieving stored gaze location data from the data storage device; performing a comparative analysis comparing the retrieved gaze location data with baseline standard data; and assessing pilot performance based on results of the comparative analysis comparing the retrieved gaze location data with baseline standard data.

In some embodiments, the method may further comprise: measuring the pilot's eye pupil diameter during operation of the aircraft; storing pupil diameter data in the data storage device during operation of the aircraft; retrieving stored pupil diameter data from the data storage device; performing a comparative analysis comparing the retrieved pupil diameter data with baseline standard data; and assessing pilot cognitive workload based on results of the comparative analysis comparing the retrieved pupil diameter data with baseline standard data.

In other embodiments, the method may further comprise: measuring the pilot's blink reflex during operation of the aircraft; storing blink reflex data in the data storage device during operation of the aircraft; retrieving stored blink reflex data from the data storage device; performing a comparative analysis comparing the retrieved blink reflex data with baseline standard data; and assessing pilot fatigue based on results of the comparative analysis comparing the retrieved blink reflex data with baseline standard data.

Another aspect of the subject matter disclosed in detail below is a method for identifying a pilot occupying a pilot seat on an aircraft, comprising: storing files of image data representing respective images of faces of authorized pilots in a database; placing a camera (e.g., an eye tracker camera) on a flight deck such that a field of view of the camera will include a face of a person occupying a pilot seat on the aircraft; using the camera to acquire image data representing an image of the face of the person occupying the pilot seat; storing the acquired image data in memory onboard the aircraft; comparing the acquired image data to the stored image data; and generating a first signal if the acquired image data matches image data in one of the stored files of image data or generating a second signal different than the first signal if the acquired image data does not match image data in any one of the stored files of image data. This method may further comprise disabling pilot flight control onboard the aircraft in response to generation of the second signal.

A further aspect is a system for identifying a pilot occupying a pilot seat on an aircraft, comprising: a database storing files of image data representing respective images of faces of authorized pilots; a camera installed on a flight deck such that a field of view of the camera will include a face of a person occupying a pilot seat on the aircraft; a computing device programmed to receive image data from the camera, compare the image data from the camera to the image data in the files of image data stored in the database, and generate either a first signal if the acquired image data matches image data in one of the stored files of image data or a second signal different than the first signal if the acquired image data does not match image data in any one of the stored files of image data; and means for disabling pilot flight control onboard the aircraft in response to generation of the second signal. The computing device and the database may be both located onboard the aircraft or on the ground.

Yet another aspect of the subject matter disclosed in detail below is a method for evaluating pilot performance during a flight of an aircraft, comprising: using an eye tracker device, monitoring the pilot's eyes during the flight; measuring a blink reflex of the pilot's eye pupil during the flight;

storing blink reflex data in a data storage device onboard the aircraft during the flight; retrieving the stored blink reflex data from the data storage device after the flight; performing a comparative analysis comparing the retrieved pupil diameter data with baseline standard data; and assessing pilot fatigue based on results of the comparative analysis comparing the retrieved blink reflex with baseline standard data. This method may further comprise: measuring a pupil diameter of the pilot's eye pupil during the flight; storing pupil diameter data in a data storage device onboard the aircraft during the flight; retrieving the stored pupil diameter data from the data storage device after the flight; performing a comparative analysis comparing the retrieved pupil diameter data with baseline standard data; assessing pilot cognitive workload based on results of the comparative analysis comparing the retrieved pupil diameter data with baseline standard data; and scheduling the pilot's next assignment taking into account the assessment of pilot cognitive workload.

Another aspect is a method for evaluating system operator performance during operation of a system, comprising: using an eye tracker device, monitoring a system operator's gaze during operation of the system; detecting a gaze location where the system operator's gaze intersects an instrument panel or a display console during operation of the system; performing a comparative analysis comparing the retrieved gaze location data with baseline standard data; and assessing system operator performance based on results of the comparative analysis comparing the retrieved gaze location data with baseline standard data. In accordance with some embodiments, this method may further comprise: measuring the system operator's eye pupil diameter during operation of the system; performing a comparative analysis comparing the retrieved pupil diameter data with baseline standard data; and assessing system operator cognitive workload based on results of the comparative analysis comparing the retrieved pupil diameter data with baseline standard data. In accordance with other embodiments, the method may further comprise: measuring the system operator's blink reflex during operation of the system; performing a comparative analysis comparing the retrieved blink reflex data with baseline standard data; and assessing system operator fatigue based on results of the comparative analysis comparing the retrieved blink reflex data with baseline standard data. This methodology has application when the system operator is a pilot and the system is an aircraft in flight or when the system operator is an air traffic controller and the system is an air traffic management system.

Other aspects of systems and methods for monitoring the performance of airline pilots or ATM operators are disclosed below.

Figure 1:
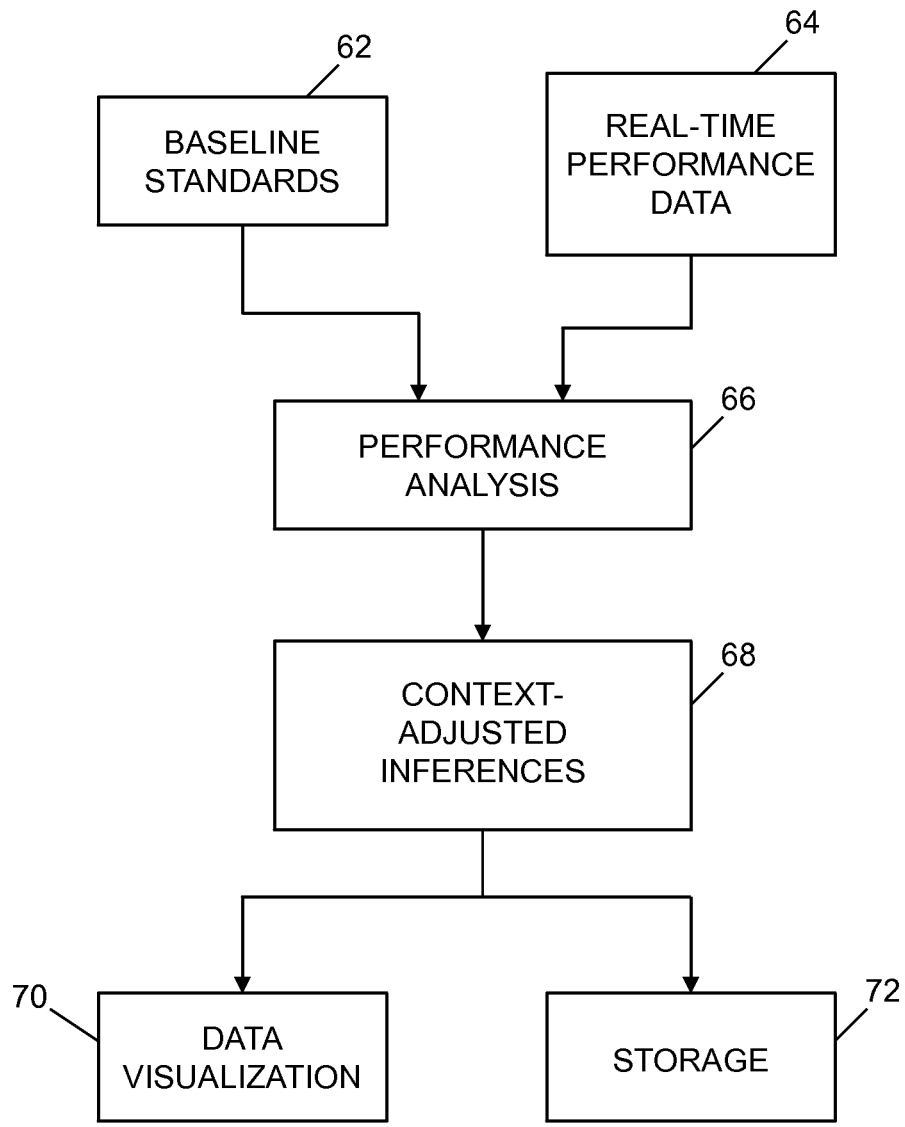
FIG. 1 is a flowchart providing a high-level view of an aviation performance evaluation methodology that can be implemented in various ways depending on the applications of interest.

Reference will hereinafter be made to the drawings in which similar elements in different drawings bear the same reference numerals. Where reference is made in any one or more of the accompanying drawings to steps and/or features, which have the same reference numerals, those steps and/or features have, for the purposes of this description, the same function(s) or operation(s), unless the contrary intention is apparent.

DETAILED DESCRIPTION

FIG. 1 is a flowchart providing a high-level view of an aviation performance evaluation methodology that can be implemented in various ways depending on the applications of interest. This aviation performance evaluation methodology can be used to monitor and assess the real-time actual performance data of pilots or ATM operators.

Baseline standards for expected performance are stored in one or more databases (step 62). For example, one database may contain performance parameters and another database may contain baseline standards such as expert gaze data. Real-time actual performance data is acquired using an eye tracker system comprising at least one camera, at least one infrared light source, and a computer system programmed to process image data from the camera(s) (step 64). In addition, the manipulation of flight deck instruments is monitored, e.g., autopilot controls, flight management computer settings, control yoke, etc. These actions are also evaluated within current context and baseline parameters. The actual and expected performance data are input to the computer system, which is programmed to analyze the actual performance based on a comparison of the actual and expected performance data (step 66). In the case of pilot performance, this comparative analysis may take into account instrument tolerances, regional attention, phase of flight context, flight instrument variables, pilot gaze scan data, and instrument/scene video. Based on the results of the comparative analysis, context-adjusted inferences can be made regarding flight performance, adopted strategies, gaze scan quality, alertness or distraction, situational awareness, and workload (step 68). The inferences, performance data, and summary metrics can be visualized on a display screen (step 70). In addition, the inferences, performance data, summary metrics, audio and video can be stored in a computer memory (step 72).

Figure 2:
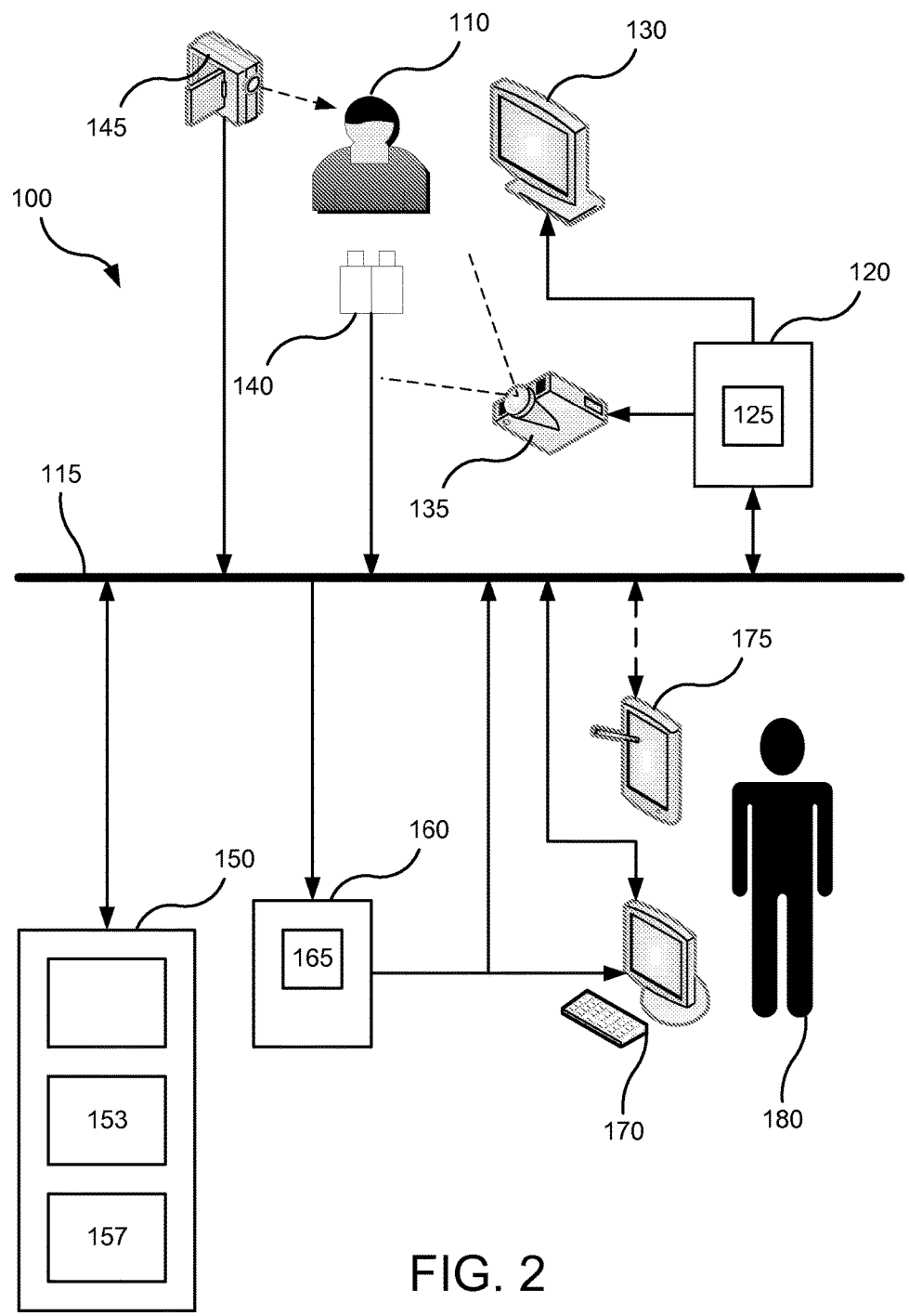
FIG. 2 is a block diagram representing components of an aircrew training system in accordance with one embodiment.

FIG. 2 is a block diagram of an aircrew training system 100 in accordance with one embodiment. The system 100 includes a computing device 120 that is configured to host a flight simulator software application 125. The flight simulator 125 is configured to simulate the behavior of a particular model of aircraft in order to train a student pilot 110.

The computing device 120 is also configured to provide a user interface through which the student 110 can "operate" the simulated aircraft of the flight simulator 125 during a training exercise in conventional fashion. The flight simulator 125 generates several kinds of real-time data indicating the current state of the simulator 125.

(1) "Out-of-cockpit view" video data, showing a simulated pilot's view of the airspace and terrain over which the training exercise is being conducted. In the system 100 illustrated in FIG. 2, the "out-of-cockpit view" video is provided to a video projector 135 that projects the "out-of-cockpit view" onto a surface (not shown) that is viewable by the student 110. In other implementations, the "out of cockpit view" is provided in portions to one or more display screens, each of which shows a separate portion of the "out of cockpit view" to the student 110.

(2) "Instrumentation view" video data showing simulated flight instruments. In the system 100 illustrated in FIG. 2, the "instrumentation view" video is provided to a single display 130. In other implementations, the "instrumentation view" video is provided to multiple displays, each of which shows a separate portion of the "instrumentation view".

(3) Audio data representing the simulated sound of the aircraft for presentation to the student 110 via a loudspeaker or headphones.

(4) Flight simulator variable data indicating aspects of the current state of the simulated aircraft and the student's operation of the simulator 125. Some of the flight simulator variables, such as airspeed, altitude, etc., are graphically represented in the instrumentation view video data. However, some of the flight simulator variables, such as yoke control parameters, are not graphically represented in the instrumentation view video data.

The VADAAR product (previously known as SimOps) from the ImmersaView company (www.immersaview.com) of Banyo, Queensland, Australia, is a commercially available system that is configurable for handling the data from the simulator 125 in the manner described below.

The system 100 also comprises an eye tracker 140 that is configured to non-invasively track the current direction of the visual gaze of the student 110. In one implementation, the eye tracker 140 comprises a single camera, two infrared light sources, and a computer programmed to perform face video image processing, which includes the IR reflection glints on the eye. The eye tracker software tracks the "glint" of the reflection of the infrared light from the iris contour of each eye of the student 110 and thereby generate real-time data indicating the three-dimensional angle of the student's gaze direction. One example of such an eye tracker 140 is Foveo, available from Seeing Machines Inc. (www.seeingmachines.com) of Canberra, Australia. Once correctly calibrated to a three-dimensional CAD model of the physical environment of the simulator 125, as described below, the eye tracker 140 generates real-time data indicating the three-dimensional point of intersection of the student's gaze. The analysis server analysis server "translates the eye tracker x-y-z coordinates into pixel coordinates when the intersection point resides within flight deck display regions (e.g., display 130 and projector 135). If the intersection point does not reside within a display region, one can continue to use the eye tracker coordinates alone to determine the position against the CAD model. The eye tracker 140 also provides pixel coordinates of the student's gaze on the video data displayed by the display 130 and the projector 135. In other implementations, the system 100 comprises multiple eye trackers 140 to increase the range of gaze direction values measurable by the system 100.

Multiple camera modules may be networked together within the eye tracker unit, thereby extending the eye tracking coverage throughout the flight deck.

The system 100 also includes a "scene" camera 145 that is configured to generate real-time "scene" audiovisual data including the student 110 and the computing device 120. The scene camera 145 provides an audiovisual record of the physical activity undertaken by the student 110 while interacting with the computing device 120 for relay to the computer tablet 175 and instructor console 170, as further described below.

The eye tracker 140, the computing device 120, and the scene camera 145 are connected to a local area network 115 so as to provide their respective data feeds to other elements of the system 100. The computing device 120 is configured to provide over the network 115 real-time data from the flight simulator 125, namely, the audio data, the two kinds of video data (cockpit view and instrumentation view), and the flight simulator variable data. The scene camera 145 is configured to provide the scene audiovisual data over the network 115. The eye tracker 140 is configured to provide calibrated gaze direction data over the network 115.

Also connected to the local area network 115 is a data server 150. The data server 150 contains a computer readable storage medium 151 and is configured to synchronously record, and synchronously play back, the data received over the network 115 from the computing device 120, the scene camera 145, and the eye tracker 140 to or from the computer readable storage medium 151. The data server 150 also contains two databases:

(1) A flight performance parameter database 153 containing baseline information relating to the expected values and tolerances of simulator variables. This baseline information is grouped according to different activities, such as procedural activities associated with each phase of flight, and corrective actions such as "climb" or "bank left".

(2) An experienced gaze database 157 containing experienced gaze information, such as regional dwell times, scan patterns, and other parameters that characterize the visual attention of an experienced pilot. The experienced gaze information is grouped by activity within any phase of flight in similar fashion to the flight performance parameter database 153.

Also connected to the local area network 115 is a performance analysis server 160. The performance analysis server 160 is configured to execute a software application 165 referred to herein as the "performance analysis tool". The performance analysis tool 165 comprises face video image processing software, which includes software that processes the IR reflection glints on an eye. The performance analysis tool 165 analyzes the video image data received over the network 115 from the computing device 120 and the eye tracker 140 to generate analysis results for presentation to an instructor 180. The data analysis methods performed by the performance analysis tool 165 are described in detail below. The performance analysis tool 165 provides the analysis results over the network 115.

The system 100 also comprises an instructor console 170 and a tablet computing device 175, each configured to be operated by the instructor 180. The instructor console 170 and a tablet computing device 175 are each connected to the local area network 115. The connection between the tablet computing device 175 and the local area network 115 is illustrated in FIG. 2 in dashed form to indicate its preferably wireless nature, although a wired connection is also contemplated. The instructor console 170 and the tablet computing device 175 are each configured to present the audiovisual data received over the network 115 from the computing device 120, the scene camera 145, and/or the data server 150, and to overlay the analysis results received from the performance analysis tool 165 via the network 115 in the manner described in detail below. The tablet computing device 175 is more suitable for use by the instructor 180 during real-time simulator training, whereas the instructor console 170 is more suitable for debriefing and post-training assessment activities. In an alternative implementation, the system 100 does not include the tablet computing device 175. The instructor console 170 and the tablet computing device 175 are also each configured to provide a user interface through which the instructor 180 can manipulate the presentation of the audiovisual data received over the network 115 from the computing device 120, the scene camera 145, and/or the data server 150 and the analysis results generated by the performance analysis tool 165. Through the provided interface, the instructor 180 can also control the recording and playback of flight simulator data, gaze scan data, and analysis results to and from the data server 150.

In the system 100 illustrated in FIG. 2, the performance analysis server 160 is separate from the instructor console 170 and the data server 150. In alternative implementations, two or more of the performance analysis server 160, the data server 150, and the instructor console 170 are combined within a single computing device.

The system 100 illustrated in FIG. 2 is configured to operate in several modes. In each mode, the flow of data between the elements of the system 100 via the network 115 is different.

The modes of operation are as follows:

Calibration:

The eye tracker 140 determines a gaze vector by tracking the position of the student's pupil relative to a stationary infrared reflection on the iris contour. Additional calibration is required to reduce the error between the tracker's calculated gaze direction and the point in which the student's actual gaze direction intercepts with the physical environment, known as the point of gaze intersection. The analysis tool 160 comprises preconfigured three-dimensional regions within the flight deck, such as instrument displays, out of cockpit displays, and panels of physical instruments, such as knobs and dials. In one implementation of calibration, the eye tracker 140 measures two or more gaze direction values, each taken when the student 110 is gazing at corresponding predetermined reference points within each region. The reference points are initially forwarded by the eye tracker 140 as video data for presentation on the simulator displays, or alternately through the placement of physical markers on panels of instruments. The difference between the measured and expected points of intersection provides error data that is used to extrapolate gaze intersection corrections across each region. Thereafter, in subsequent modes, the eye tracker 140 provides the real-time gaze intersection point values over the network 115.

Live Test/Record:

The flight simulator audio data and video data (comprising the out-of-cockpit view data and the instrumentation view data) are provided to the instructor console 170 and the tablet computing device 175 for presentation thereon. Meanwhile, the flight simulator data and the gaze scan data are analyzed by the performance analysis tool 165 in the manner described in detail below. The analysis results generated by the performance analysis tool 165 are received by the instructor console 170 and the tablet computing device 175 for presentation to the instructor overlaid on the display of the simulator video data in the manner described below. At the same time, the flight simulator data (comprising the audiovisual data and the flight simulator variables) and the gaze scan data are synchronously recorded by the data server 150 for later playback in replay mode. The analysis results generated by the performance analysis tool 165 are also recorded by the data server 150 for later synchronous playback in replay mode, described below.

Replay:

The flight simulator data, gaze scan data, and analysis results previously recorded by the data server 150 are synchronously played back by the data server 150 under the control of the instructor 180 through an interface on the instructor console 170 or the tablet computing device 175. The played-back flight simulator data, the gaze scan data, and the analysis results are displayed on the instructor console 170 and the tablet computing device 175. In one implementation of replay mode, the played-back flight simulator data, the gaze scan data, and the analysis results are also received and synchronously played back on the computing device 120 for display to the student 110 via the simulator display 130 and the projector 135.

In order to draw appropriate conclusions regarding the performance of a student pilot, the context of the student's actions needs to be determined and baseline information regarding visual attention and aircraft state appropriate for that context needs to be retrieved. As mentioned above, the performance analysis tool 165 executing within the performance analysis server 160 analyzes real-time data obtained from the simulator 125 and the eye tracker 140 against baseline information associated with a current context so as to provide the instructor 180 with context-dependent performance results.

The current context is initially determined by the performance analysis tool 165 from the simulator data, which contains broad indications of the current phase of flight based on the flight time and the simulated flight plan. The current context may be refined by the instructor 180 through real-time input via the computer tablet 175 and instructor console 170, or by the performance analysis tool 165 from the flight simulator variables and/or the student visual attention behavior relative to baseline information associated with the current phase of flight. For example, the current context could be inferred as a procedural activity within the current phase of flight. Alternatively, in response to an unexpected event, the student may have initiated a corrective action that increases visual attention toward instruments that would otherwise be of low priority within the current phase of flight. The corrective action would then be inferred as the current context. In this scenario, the performance analysis tool 165 would take into account the context of the corrective action rather than a procedural activity that would otherwise be in progress within the current phase of flight. The performance analysis tool 165 may also take into account the appropriateness of the new context against the baseline activity. For example, the pilot may be manipulating the auto pilot at an inappropriate time, but in a manner that is appropriate. Therefore, the context would be evaluated as inappropriate.

The performance analysis tool 165 is configured to evaluate the visual attention behavior of a student both qualitatively and quantitatively by evaluating real-time gaze scan data against the experienced gaze information for the current context obtained from the experienced gaze database 157. Poorly directed visual attention may be characterized as distractions, or associated with poor strategy, such as when students allocate visual attention to regions within the instrumentation view or out-of-cockpit view that are not considered high priority for expected activities in the current phase of flight or for the current corrective action.

A student's situation awareness may be inferred through an evaluation of how effectively they monitor and attend to instruments relevant to the current state of the aircraft. Observing the student perceiving the changing state of instrument variables and consequently adopting an appropriate strategy provides insight into the student's level of information processing. Similarly, certain characteristics of gaze scan data, such as changes in dwell time and scan rate, imply changes in workload for the student.

Further, a Galvanic Skin Response (GSR) sensor may be incorporated into the system depicted in FIG. 1. This GSR sensor could be similar to Affectiva's wireless "Q Sensor 2.0" device shown at http://www.affectiva.com/q-sensor/. This GSR device is adapted to measure skin conductance, which is known to correlate with arousal. For example, the GSR device may be in the form of a bracelet or any other suitable device that can be worn by the subject. A wireless stream of the GSR sensor's raw data may be recorded into the performance analysis tool. The fluctuating GSR data is then evaluated within the context of the current student strategy. Changes in arousal can be used to infer levels of associated stress, workload, uncertainty, and other emotional and cognitive aspects of student behavior related with the identified strategy. For instance, if the student is evaluated as having adopted a "confused" strategy, meaning that he is performing illogical or irrelevant activity, elevated GSR readings may be inferred as stress/uncertainty, further supporting a richer characterization of the strategy and performance data. This data may be presented as directional trending information through text, and/or incorporated within other graphical performance flags.

It will be understood that other sensing devices may be incorporated into the system, including heart rate and EEG sensors for example, to enhance the data collected and provide more accurate strategy and performance data.

As mentioned above, the results from the performance analysis tool 165 are presented to the instructor 180 through the instructor console 170 and the tablet computing device 175. The displays of the instructor console 170 and the tablet computing device 175 present the video data from the flight simulator 125, overlaid with the results generated by the performance analysis tool 165. The overlays are of three kinds:
  (a) Time configurable gaze scan traces that provide—real time or historical illustrations of a student's gaze intersection point.
  (b) Performance flags, comprising text and graphical indicators, that indicate breakdowns, i.e., significant deviations from expected visual attention within the current context.
  (c) Performance measurements comprising text and numeric data based on cumulative statistics on flight performance and gaze behavior. The performance measurement data includes the determined operational context.

Strategies adopted by the student are summarized in detail and characterize the objective intent of student activity for the instructor to dismiss or confirm, thereby adding a level of subjective validation to the analysis results generated by the performance analysis tool 165.

The instructor 180 may, through the interface on the instructor console 170 or the tablet computing device 175, generate time synchronized annotations of the recorded data stream to identify performance breakdowns or instances that may require attention during post training debrief. The annotations are stored synchronously with the simulator data and form part of the played-back data in replay mode.

Figure 3:
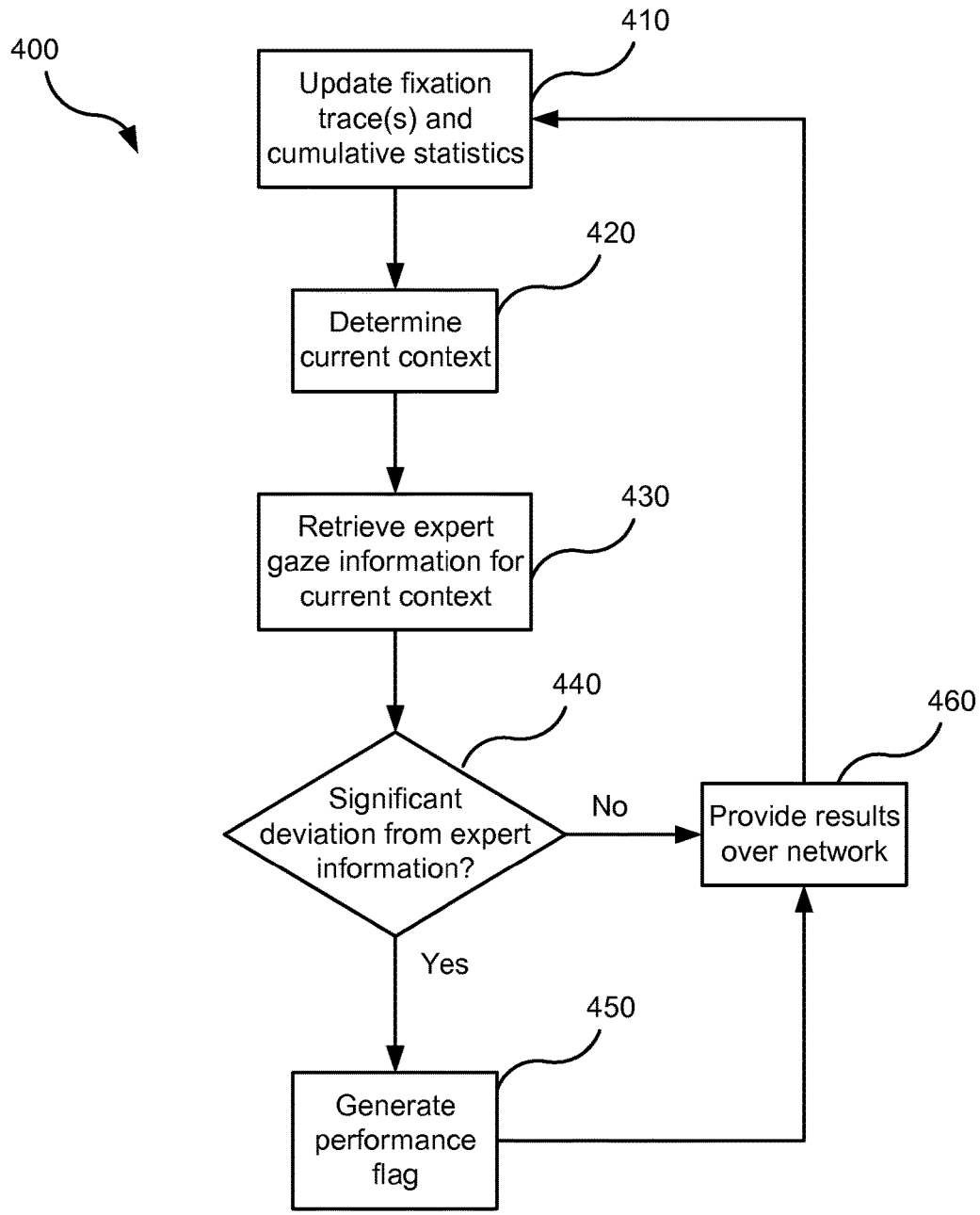
FIG. 3 is a flow diagram illustrating an analysis method carried out by a performance analysis server in accordance with one embodiment.

FIG. 3 is a flow diagram illustrating an analysis method 400 carried out by the performance analysis tool 165 executing within the performance analysis server 160 of FIG. 2 in accordance with one embodiment. The method 400 starts upon receipt of a gaze intersection value from the network 115, whereupon the performance analysis tool 165 updates one or more gaze scan traces with the received gaze intersection point (step 410). In one implementation, the performance analysis tool 165 also updates the cumulative statistics on flight performance and gaze behavior using the received gaze intersection point and the current simulator variable values extracted from the simulator data.

In step 420, the performance analysis tool 165 determines the current operational context using the current simulator variable values extracted from the simulator data and the recent gaze scan history. The current context includes the procedural activity associated with the current phase of flight or any corrective action or instrument manipulation currently being undertaken by the student.

At the next step 430, the performance analysis tool 165 retrieves the baseline information and the experienced gaze information associated with the current context (determined in step 420) from the flight performance parameter database 153 and experienced gaze database 157 respectively.

The method 400 then proceeds to step 440, in which the performance analysis tool 165 determines whether the student's visual attention has deviated significantly from the experienced gaze information associated with the current context. If not, the method 400 at step 460 provides the current context and the analysis results, including the gaze scan trace(s), over the network 115, and returns to step 410 to await the next gaze intersection value from the network 115. If the deviation is significant, the performance analysis tool 165 at step 450 generates a performance flag indicating the nature of the deviation. The method 400 then provides the current context and the analysis results (step 460), including the gaze scan trace(s) and the performance flag(s), over the network 115 and returns to step 410.

Figure 4:
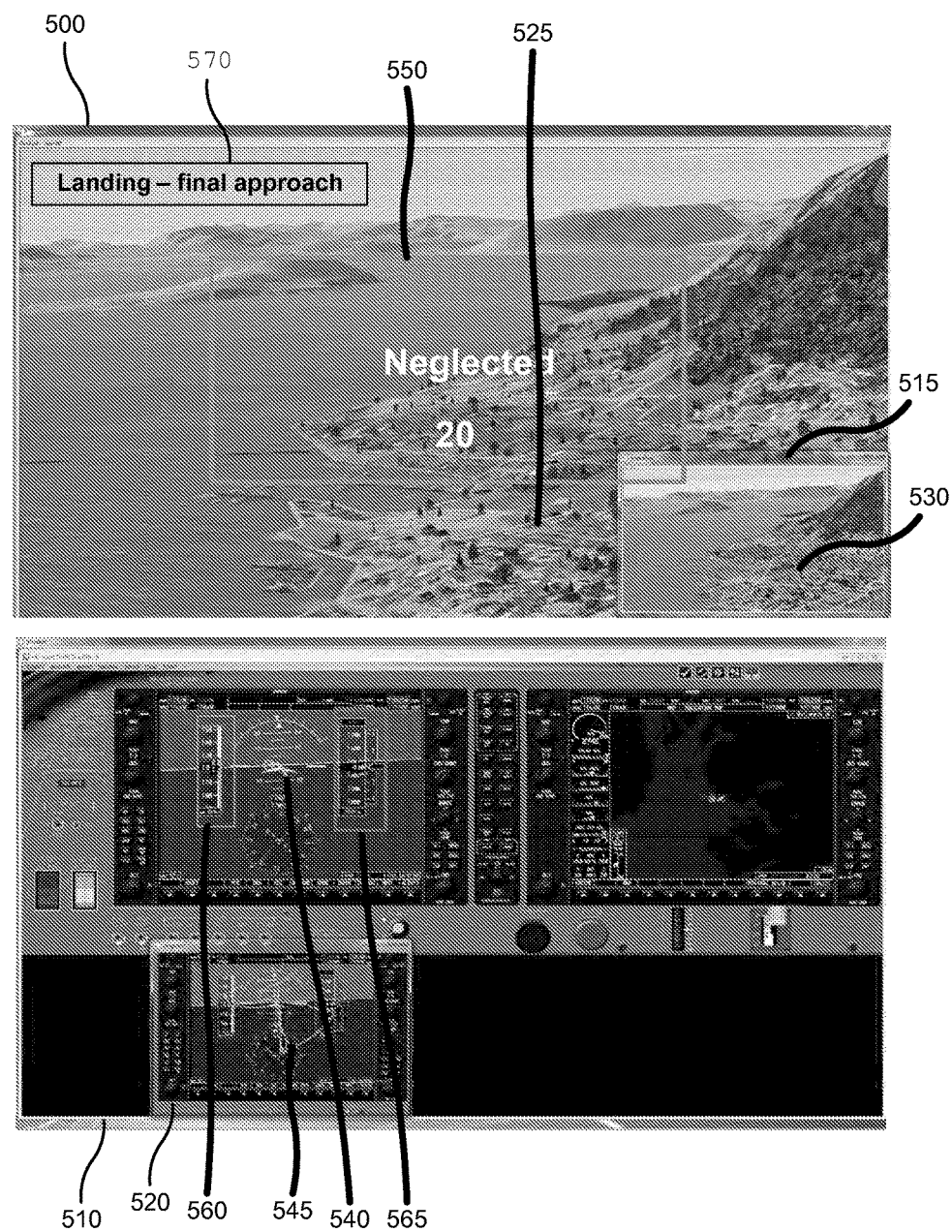
FIG. 4 includes two illustrative screenshots of video data presented to the instructor via the instructor console in the system of FIG. 2 using the method of FIG. 3.

FIG. 4 contains two exemplary screenshots 500, 510 of video data presented to the instructor 180 via the instructor console 170 in the system 100 of FIG. 2 using the method 400 of FIG. 3. The upper screenshot 500 represents one frame of the out-of-cockpit view video data presented at one instant during the "landing" phase of a flight simulator exercise. The current context is the "final approach" procedural activity of the landing phase.

The upper screenshot 500 includes a smaller window 515 showing a grayscale snapshot picture of the out-of-cockpit view video in the main window of the upper screenshot 500. The lower screenshot 510 represents one frame of the instrumentation view video data presented via the display 130 and captured at the same instant during the same flight simulator exercise as the upper screenshot 500. The lower screenshot 510 includes a smaller window 520 showing a grayscale snapshot picture of the instrumentation view video in the main window of the lower screenshot 510.

Overlaid on the main window of the upper screenshot 500 is a gaze scan trace 525 indicating a portion of the recent history of the student's successive points of intersection, that is, the most recent one or two seconds of the gaze scan while it was within the display of the out-of-cockpit view data. Overlaid on the smaller window 515 of the upper screenshot 500 is a gaze scan trace 530 indicating a longer portion of the recent history of the student's gaze scan than that displayed in the main window of the upper screenshot 500. In the implementation shown in FIG. 4, the trace 530 is a static snapshot of the visual scan behavior that occurred during the last period of the student's visual attention to the out-of-cockpit view. The display of the trace 530 is configurable by the instructor.

The lower screenshot 510 is overlaid with a gaze scan trace 540 showing a further portion of the recent history of the student's gaze scan, that is, the most recent one or two seconds of the scan while it was within the display of the instrumentation view data. Overlaid on the smaller window 520 of the lower screenshot 510 is a gaze scan trace 545 indicating a longer portion of the recent history of the student's gaze scan than that displayed in the main window of the lower screenshot 510. In the implementation shown in FIG. 4, the trace 545 is a static snapshot of the visual scan behavior that occurred during the last period of the student's visual attention to the instrumentations view. The display of the trace 545 is configurable by the instructor. In one implementation, the gaze scan traces 525, 530, 540, and 545 are displayed in a green color.

Also overlaid on the upper screenshot 500 is a performance flag, namely a rectangle 550 containing the words "Neglected 20", indicating that the student's gaze scan has not entered the region indicated by the rectangle for at least 20 seconds, which represents a significant deviation from the experienced gaze behavior associated with the current context. In one implementation, the performance flag 550 is displayed in a red color.

Performance flags, i.e., rectangles 560 and 565, are also overlaid on particular instruments within the lower screenshot 510. The leftmost rectangle 560 indicates that the student's gaze has neglected the underlying instrument compared to the experienced gaze behavior associated with the current context. The rightmost rectangle 565 indicates that the student has overattended to the underlying instrument in relation to the experienced gaze behavior associated with the current context. In one implementation, the "neglect" performance flag 560 is displayed in a red color, while the "overattended" performance flag 565 is displayed in a blue color.

The upper screenshot 500 also contains a text box 570 presenting the current operational context to the instructor 180, to assist the instructor 180 to judge the accuracy and significance of the performance flags 550, 560, and 565. The instructor's interface on the instructor console 170 is configured to allow the instructor to confirm, reject, or correct the current operational context as presented in the text box 570.

Figure 5:
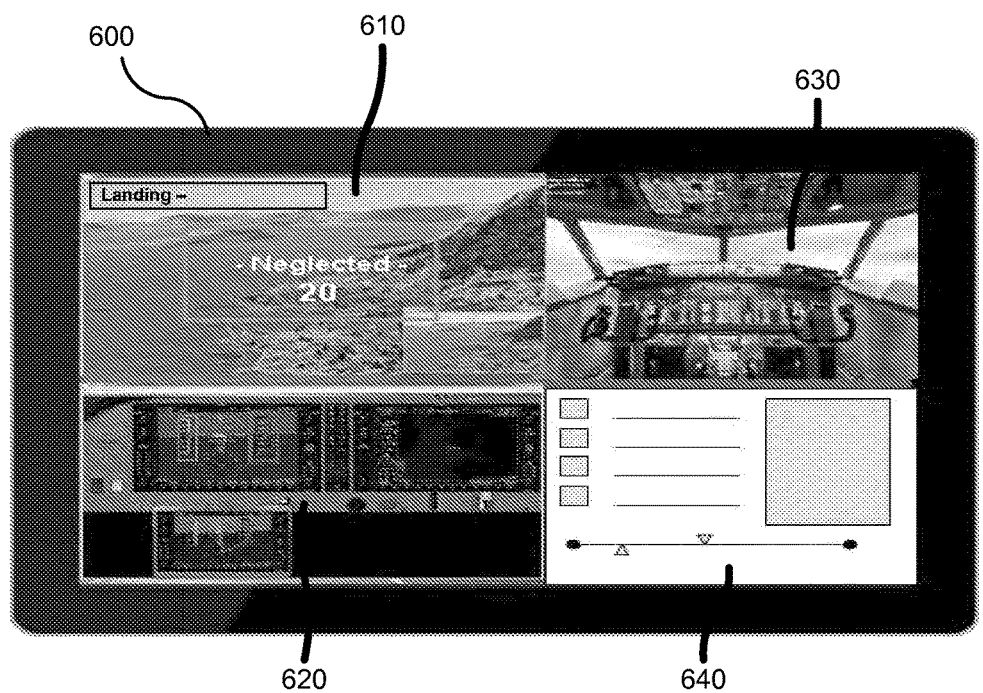
FIG. 5 is an illustrative screenshot of video data presented to the instructor via the tablet computing device in the system of FIG. 2 using the method of FIG. 3.

FIG. 5 contains an exemplary screenshot 600 of video data presented to the instructor 180 via the tablet computing device 175 in the system 100 of FIG. 2 using the method 400 of FIG. 3. The screenshot 600 represents the same instant during the same flight simulator exercise as illustrated in the example screenshots of FIG. 4. The upper left quadrant 610 and lower left quadrant 620 of the screenshot 600 are reproductions of the screenshots 500, 510 presented to the instructor 180 via the instructor console 170. The upper right quadrant 630 represents one frame of the scene video data obtained from the scene camera 145. The lower right quadrant 640 contains a graphical interface through which the instructor can control the playback of the simulator data during replay mode, and enter annotations to the simulator data as described above.

Figure 6:
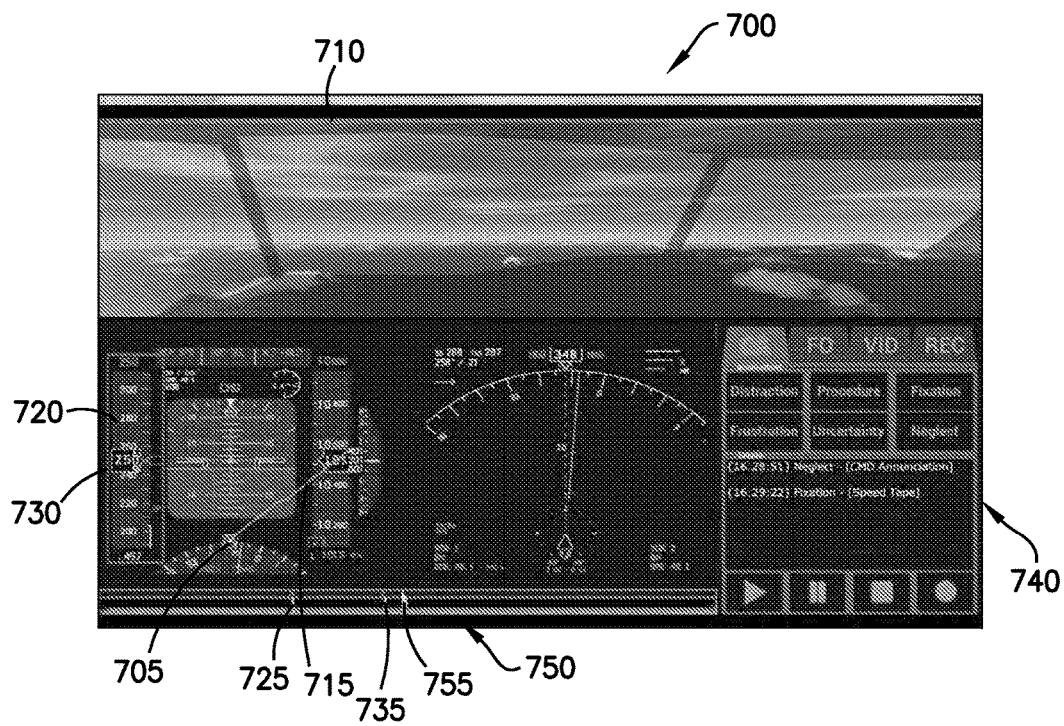
FIG. 6 is an illustrative screenshot of video data presented to the instructor in accordance with an alternative embodiment.

FIG. 6 is an illustrative screenshot 700 of video data presented to the instructor in accordance with an alternative embodiment. The video can run on either the instructor's console or the instructor's tablet computing device. The upper portion 710 of screenshot 700 represents one frame of the out-of-cockpit view video data presented at one instant during the "cruise" phase of a flight simulator exercise. A major portion of the lower portion of screenshot 700 (occupying a middle portion of the lower portion of the screenshot and extending to the left in FIG. 6) represents one frame of the instrumentation view video data captured at the same instant during the same flight simulator exercise as the upper portion of screenshot 700. The instrumentation depicted includes: (a) the primary flight display (comprising a speed tape 720 and other components) on the left; and (b) the navigation display in the middle of the lower portion of screenshot 700.

Overlaid on the primary flight display is a current gaze intersection point indicator 705 in the form of a circle or ellipse and a gaze scan trace 715 indicating a portion of the recent history of the student's gaze scan (i.e., successive points of intersection of the visual gaze). The gaze scan trace 715 starts at the center of the circle or ellipse and trails behind the current gaze intersection point indicator 705 as the latter moves to reflect the location of the tracked gaze intersection point of the student pilot. Although the screenshot of FIG. 6 shows the current gaze intersection point indicator 705 and gaze scan trace 715 overlying the primary flight display, that indicator and trace may be positioned over any portion of the out-of-cockpit view or instrumentation view depending on where the student pilot's gaze intersects the environment at any particular moment during a simulation exercise.

In addition, in this illustration a performance flag, i.e., a rectangle 730, is overlaid on the speed tape 720 to indicate that the student pilot has overattended to, i.e., fixated on, the underlying speed tape in relation to the experienced gaze behavior associated with the current context. The "fixation" performance flag 720 can be displayed in any sufficiently contrasting color. This is one example of the capability of the system to auto-generate a flag through defined logic that determines a fixation or neglect.

Also, a horizontal record stream bar 750 is overlaid on a lower portion of the instrumentation view seen in FIG. 6. The total length of record stream bar 750 may be calibrated to reflect the duration of the flight simulation exercise in progress. An elapsed time indicator 755 moves at constant speed from left to right along the record stream bar 750 to indicate the passage of time from start to finish of the exercise. In addition, each time a performance flag is auto-generated by the system, a corresponding indicator appears on the record stream bar 750. Screenshot 700 shows a Neglect indicator 725 and a Fixation indicator 735 on the record stream bar 750, the relative positions of the indicators along the bar reflecting the fact that an instance of neglect occurred prior to a recent instance of gaze fixation. A Fixation performance flag 730, generated at the same time as the Fixation indicator 735, continues to be displayed at the later time indicated by elapsed time indicator 755.

Returning to the general arrangement of display elements depicted in FIG. 6, a minor portion (i.e., the rightmost portion) of the lower portion of screenshot 700 is occupied by a graphical user interface 740, by means of which the instructor can control the playback of the simulator data during replay mode and can enter time-stamped annotations to the simulator data. In the example shown in FIG. 6, two time-stamped annotations appear in a text field for event logging, which annotations indicate that the student pilot neglected a CMD annunciation at a time 16:28:51 and thereafter fixated his/her gaze on the speed tape (item 720 in FIG. 6) at a time 16:29:22. These time-stamped annotations can be generated by the instructor pressing corresponding preconfigured virtual buttons (see, e.g., the virtual buttons labeled "Neglect" and "Fixation") which are displayed as part of the graphical user interface 740. Pressing an annotation virtual button time stamps the associated label into the recorded stream. In addition, annotations could be text-based notes input by the instructor using a virtual keyboard (not shown in FIG. 6) on the display screen.

The screenshot shown in FIG. 6 is taken from a demonstration video that shows two performance breakdowns during a flight simulation exercise. First, the student visually neglected the CMD annunciation after selecting the auto pilot. In the video (i.e., in screenshots preceding the screenshot shown in FIG. 6), first an amber rectangular border is displayed around the CMD annunciation on the instructor's tablet, then the amber border changes to red when a threshold neglect time has elapsed (Neglect indicator 725 was displayed at the same time), following which a "Neglect—[CMD Annunciation]" annotation automatically appeared in the event log in GUI 740. Second, the student visually fixated on the speed tape 720 for an inordinate length of time, which caused a rectangular border, i.e., Fixation performance flag 730, to appear on the instructor's tablet after a threshold fixation time had elapsed (Fixation indicator 735 was displayed at the same time), following which the "Fixation—[Speed Tape]" annotation automatically appeared in the event log in GUI 740. In this example, the two performance flags were auto-generated based on logic within the performance analysis tool that evaluates student scan behavior against the current aircraft state and baseline experienced pilot behavior database information.

The annotation buttons 740 may be manually pressed by the instructor when performance breakdowns are observed. Similarly to auto-generated performance flags, this action inserts a performance flag indicator into the record stream bar 750, and logs the appropriate flag as text into the event log in GUI 740.

Figure 7:
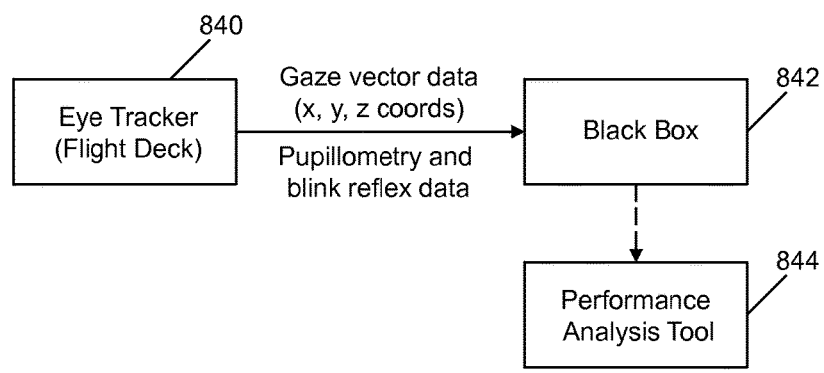
FIG. 7 is a block diagram identifying some components of a system for recording pilot performance data during flight.

The system described above utilizes eye tracking and data handling technologies to assess a student pilot's allocated attention relative to the current state of the aircraft and a baseline set of performance expectations that reside within a database in the performance analysis tool. The results from the real-time analysis of this information can be made available to an instructor via a wireless tablet PC, as depicted in FIG. 7. This information can inform the instructor when a student is neglecting or fixating on information and therefore facilitate improved engagement between the instructor and student.

Instructors currently rely on the subjective interpretation of cues when assessing a student pilot's instrument scan. For example, changes in the student's head orientation and physical activity indicate adjustments in regional attention within the flight deck. While these cues are often vague and difficult to evaluate, they allow the instructor to make deductive causal inferences when the aircraft is in an unacceptable configuration or profile. This often relates to the student pilot having a defective instrument scan behavior and therefore a lack of awareness regarding the current state of the aircraft.

A student pilot may not have flown a commercial jet before, so one important aspect of the pilot screening assessment relates to evaluating the student's ability to take guidance from the instructor and modify their instrument scan behavior as directed. The performance analysis tool may include software that quantifies the student's ability to modify his/her instrument scan behavior between consecutive flights, therefore providing the instructor with more objective information to judge the student's ability to effectively develop or transition his skills to suit the current aircraft. The provision of a pilot performance data repository will also enable the instructor to evaluate the student performance against the current industry standard.

To accomplish the foregoing, one can tailor the way in which the automatic performance analysis of the data is configured to determine how effectively a candidate is taking on guidance from the instructor and adapting his/her behavior appropriately to meet expectations regarding their instrument scan and flight deck interaction. Existing baseline performance data can be used to inform expectations for a pilot's instrument scan. For example, one can develop a simple flight scenario (takeoff, circuit, landing) that allows the instructor to gauge the student pilot's performance against a proficient type-rated pilot. After several flights, one could provide the instructor with summary metrics that indicate how the candidate's instrument scan and flight deck interaction (i.e., time to perform tasks and appropriate sequencing/selection of actions) has improved throughout the session. The instructor might also be able to tailor the type of analysis that he/she wishes to perform on the data, such as gaining more detailed insight into a particular problem that has been identified. This might relate to determining the student pilot's familiarity with instrument layout as measured by a lack of objectivity in the scan pattern (i.e. transitions between flight deck regions appear to lack objectivity and structure). Another example might be to evaluate the student pilot's allocated attention for a given procedure associated with an event. This might be measured through pre-emptive instrument state scan behavior, which may indicate that the student pilot expects the onset of a particular event and is therefore looking out for indications within the flight deck that inform such a state change. If instructed to do so previously, this would be a good measure of the candidate's ability to adapt and gain appropriate skills.

This method takes the subjectivity out of evaluating student pilot performance. Objective pilot performance data enables instructors to make more informed and robust decisions regarding the student pilot's current abilities and potential to develop appropriate skills.

Figure 8:
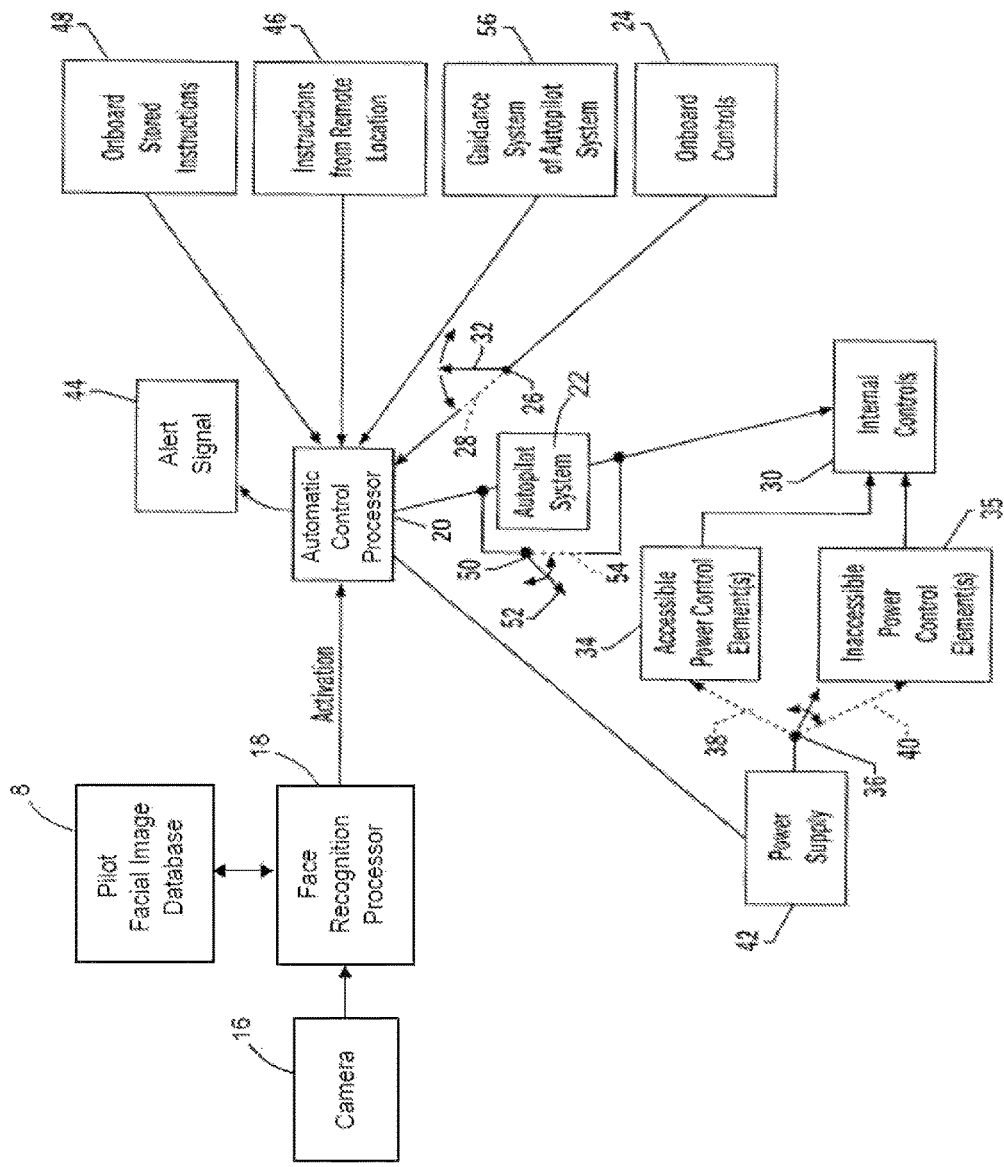
FIG. 8 is a block diagram identifying some components of an automatic control system for automatically taking away control of flight operations from a pilot in certain emergency situations.

The above-described eye tracking capabilities can be applied in other aviation scenarios in which monitoring human performance is desirable. In addition to the flight simulator training setting, these capabilities may be utilized to monitor pilot performance onboard an aircraft during flight. More specifically, eye tracking technology can be integrated into the flight decks of civilian or military aircraft with a flight recorder (colloquially known as a "black box"). As depicted in FIG. 8, an eye tracker 40 can provide an additional data feed to a black box 42 onboard an aircraft, thereby providing a record of the pilot's allocated visual attention (i.e., instrument and out-of-flight deck scan behavior) leading up to an incident. The eye tracking data could be quickly analyzed by crash investigators utilizing the above-described pilot performance analysis tool 44.

In accordance with the embodiment partly depicted on a high level in FIG. 8, the eye tracker 40 outputs a stream of x, y, z coordinates for the pilots' gaze, which would be sent to the black box 42 for recording. In addition, measurements of the pilot's pupil diameter and blink reflex would be recorded for possible fatigue and cognitive workload analysis. Frequency and duration of blinks as well as eye closure speed are the primary indicators of eye fatigue. During fatigued behavior, the blinking frequency decreases and the eye closes more slowly than during normal behavior. Algorithms that determine fatigue and cognitive workload utilizing measures of blink reflex, perclos, and pupil diameter are well known to persons skilled in the art.

The pilot performance analysis tool 44 can provide accident investigators with an efficient way in which to reconstruct and analyze the pilot's instrument scan behavior throughout the duration of the black box data. This data could then be compared to similar pilot performance data contained in the pilot performance data repository and baseline performance data contained in the performance analysis tool to help determine instances where pilot behavior deviated from expected behavior considered to be "gold standard" for a particular phase of flight or activity.

The existing solution is subjective, relying on the interpretation of verbal transcripts, aircraft state, and pilot interaction with the flight deck to make a deductive causal inference regarding a pilot's allocated attention. The proposed solution provides objective insight into the pilot's allocated visual attention utilizing data that identifies the pilot's actual point of gaze intersection within the flight deck at any point in time. This methodology helps to mitigate interpretation errors associated with the subjective evaluation of available data.

The integration of eye trackers into flight decks provides the capability to more accurately assess a pilot's visual scan behavior during crash investigations. This will decrease the time spent trying to determine the pilot's allocated attention in the lead up to an incident and allow for more definitive conclusions to be drawn regarding the pilot's' behavior leading up to an accident. Access to accurate gaze data will improve the investigator's ability to determine contributing factors that lead to an incident.

In accordance with a further enhancement, an additional computing device can be introduced into an aircraft that also receives the "black box" data and takes input from the eye tracker in order to monitor real-time pilot health and performance, thereby facilitating insight into a situation where pilots become non-responsive or the aircraft deviates off course. The computing device may be programmed to perform various analyses of the acquired data (such as face recognition and fatigue analysis of pilot pupil diameter and blink reflex data) and then issue an alert under certain conditions. For example, upon meeting certain criteria that qualify as an emergency condition, such as a pilot's performance degrading to an unacceptable level, or the pilots becoming incapacitated or subjected to a hijacking, an alert would be sent via satellite to a ground station. The alert would comprise support data from the aircrew performance evaluation device to enable ground staff to evaluate the situation and initiate appropriate action. The ground station, referred to herein as a "Pilot Monitoring and Control Center (PMCC), could be a manned facility that monitors air traffic alerts. In such an emergency, the PMCC could disengage the flight deck controls and take over the automation, possibly uploading a new flight plan into the aircraft's flight management computer (FMC) to a designated airport for an automated landing.

More specifically, the PMCC could monitor real-time emergency information from aircraft in the form of various pilot health and performance indicators, such as: pilot fatigue; pilot face recognition for security screening; pilot face video and audio for emergencies; instrument scan deficiencies; cognitive workload; heart rate; and aircraft flight coordinates.

Pilot Fatigue:

In an extreme case, if both pilots were asleep, the PMCC could take control of the automation, reprogram the FMC and configure the automation to ensure a safe flight plan is maintained until the pilots awaken. Failing the pilots awakening, the PMCC could reprogram the FMC and fly the aircraft to an airport for an automated landing.

Pilot Face Recognition:

Utilizing captured data from the eye tracker camera, face recognition software can scan the face of anyone who sits in the flight deck. The system would then compare facial scans to a database of approved pilots. If the pilot is an airline employee and scheduled to fly the specific route, the system would continue analyzing eye tracking movement. If the pilot is an employee, but not scheduled to fly the route, the system would send a message by satellite (or internet link) to the PMCC with an alert. If the pilot is not an employee, or not otherwise recognized, the system would begin an alert/protection sequence established by the airline. If the camera became obscured during flight, an alert would be generated that provides flight deck audio and video from the previous 30 sec or so leading up to the incident to the PMCC.

Aircraft Flight Coordinates:

If the aircraft is being flown by a valid pilot, but wanders off the approved flight path, the pilot is considered rogue and the system alerts the PMCC. The PMCC may then determine appropriate action, which may include taking control of the automation, squawk a highjack code, or reprogram the FMC with a new flight plan to an appropriate airport for automated landing.

Other Data Feeds:

Pilot face video and measurements associated with instrument scan, cognitive workload, and heart rate can all be utilized by PMCC staff to gain a better insight into the current emergency situation.

An automated security procedure utilizing face recognition in accordance with one embodiment may comprise the following steps:

1. When a pilot sits in either seat, the eye tracking system runs a face recognition program and compares the scan to a database of approved pilots.

a. If the pilot is employed by the airline and is scheduled as crew for the present flight, the system returns a code-green.

b. If the pilot is recognized as an employee of the airline, but is not scheduled to crew the present flight, the system will return a code-yellow.

c. If the pilot is not recognized, the system returns a code-red and sends an alert to flight operations. Flight operations can then:

i. Approve the pilot—if approved, the system will add the image to its database and "learn" the new face.

ii. Deny the pilot access, shutdown control from the flight deck, squawk hijack code, have autopilot fly to a specified airport or fly a pre-programmed route that cannot be changed.

2. Anytime a pilot leaves his/her seat or sits down, the system resets and runs face-recognition analysis again.

a. If the pilot is in the database, the system returns code-green.

b. If the pilot is not in the database, the system returns code-red and sends an alert to flight operations. Flight operations can then:

i. Approve the pilot remotely—if approved, the system adds the image to its database, ii. Deny the pilot access, shutdown control from the flight deck, squawk hijack code, have autopilot fly to a specified airport or fly a pre-programmed route that cannot be changed.

One embodiment of a system for automatically controlling a flight path of an aircraft in response to an alert includes at least one camera 16 and a face recognition processor 18, as shown in FIG. 8. (This system may also include infrared light sources (not shown in FIG. 8) in cases wherein the face recognition processor 18 also hosts software for tracking the pilot's gaze and measuring the pilot's pupil diameter and blink reflex.) The face recognition processor 18 receives facial image data from the camera 16 and processes that image data to determine whether the pilot is authorized to fly the aircraft or not. If not authorized, the face recognition processor 18 issues an activation signal to an automatic control processor 20 directing engagement of an automatic control system. In accordance with one embodiment, the face recognition processor 18 is located onboard the aircraft and communicates with a pilot facial image database 8 containing files of image data representing images of the faces of authorized pilots, which database is stored in computer memory onboard the aircraft. The face recognition processor 18 is programmed to compare the image data acquired by the camera 16 to the image data stored in the pilot facial image database 8. The face recognition processor 18 is further programmed to generate either a confirmation signal if the acquired image data matches image data in one of the stored files of image data of authorized pilots or the activation signal if the acquired image data does not match image data in any one of the stored files of image data of authorized pilots.

Once the automatic control processor 20 receives an activation signal from the face recognition processor 18, the automatic control processor 20 then initiates control of the flight path of the aircraft. In particular, the automatic control processor 20 disables any onboard capability to supersede or disengage the automatic control system, as disclosed in U.S. Pat. No. 7,142,971, the disclosure of which is incorporated by reference herein in its entirety. The automatic control processor 20 initiates control of the aircraft by activating the autopilot system 22 in conjunction with disabling any onboard capability to supersede or disengage the autopilot system, i.e., an uninterruptible autopilot mode. Thus, when the uninterruptible autopilot mode is engaged, the autopilot switching element 50 opens, such that it moves from position 54 to position 52. In this embodiment, the automatic control processor 20 may be part of the autopilot system 22 or the automatic control processor 20 may be separate from the autopilot system 22. The autopilot system 22 can control the subsequent flight path of the aircraft based upon a route that is either predetermined or calculated by the automatic control processor 20 or that is provided to the automatic control processor 20 from an offboard location as described below.

To disable any onboard capability to supersede or disengage the automatic control system, the automatic control processor 20 disables the onboard controls 24, which may include any type of interface, such as but not limited to an electronic or computer interface, with the controls of the aircraft. For example, when the automatic control system is engaged, the onboard controls 24, including interfaces to the controls, may be bypassed. FIG. 8 illustrates one embodiment of how the controls may by bypassed, although the controls may be bypassed in other ways. In the embodiment of FIG. 8, a first switching element 26 may move from a first position 28 that connects the onboard controls 24 to the automatic control processor 20 and, in turn, to the corresponding internal controls 30 of the aircraft, such as the flight control computer or the like, to a second position 32 that opens the connection between the onboard controls 24 and the corresponding internal controls 30, such that the onboard controls 24 are disabled. The first position 28 is typically the default position when the automatic control system is not engaged.

In addition, the power control element(s) 34, such as circuit breakers or any other type of power limiting elements known to those skilled in the art, that are accessible onboard the aircraft are also bypassed when the automatic control system is engaged, such that the automatic control system cannot be disengaged from onboard the aircraft by resetting the associated circuit breakers. FIG. 8 also illustrates one embodiment of how the onboard accessible power control element(s) 34 may be bypassed, although the power control element(s) may be bypassed in other ways. A second switching element 36 may move from a first position 38 that connects the power to the automatic control system through the onboard accessible power control element(s) 34 to a second position 40 that connects the power to the automatic control system through inaccessible power control element(s) 35. In other embodiments for bypassing the onboard accessible power control element(s) 34, the inaccessible power control element(s) may not be necessary or may be part of the power supply, such that the second switching element 36 may move from the first position to a second position in order to directly connect the automatic control system to the power supply 42. Again, the first position 28 is typically the default position when the automatic control system is not engaged. The automatic control system may also be connected to a battery backup power supply, such that power to the automatic control system may not be interrupted, even if the electric power to the system is interrupted.

In addition to disabling any onboard capability to supersede or disengage the automatic control system, the automatic control processor 20 may also transmit an alert signal 44 to one or more remote locations, which may include but is not limited to an airline office, an airport, and one or more governmental agencies, such as a Federal Bureau of Investigation (FBI) office, a Central Intelligence Agency (CIA) office, a Federal Aviation Administration (FAA) office, the office of Homeland Security, a military center, and/or an anti-terrorist agency office, to indicate that the automatic control system of the aircraft has been engaged. The alert signal 44 therefore alerts the necessary personnel at various locations that the security of the aircraft and/or the contents of the aircraft may be in jeopardy. In addition, the automatic control processor 20 may transmit an alert signal to other aircrafts, particularly those in close proximity. Thus, the aircrafts in close proximity will be alerted of the potentially hazardous situation facing the signaling aircraft, and can take precautions to ensure their safety, such as by giving the signaling aircraft a wide berth.

In accordance with alternative embodiments, the image data acquired by the camera 16 onboard the aircraft may be sent to a face recognition processor located on the ground, in which cases the activation signal will be sent from the ground to the aircraft. This would obviate the sending of the alert signal 44 by the automatic control processor 20. The face recognition processor on the ground may take the form of a performance analysis server programmed with face recognition software capable of processing facial image data and with eye tracking software capable of computing a gaze location, a pupil diameter and a blink reflex parameter based on the image data acquired by the camera 16.

Communication between the aircraft and the remote location may be carried out in any manner known to those skilled in the art. For instance, the communication may be, but is not limited to being, conducted via a radio or satellite network. In addition, the communication link between the aircraft and the remote location may be dedicated for transmitting signals related to the automatic control system only. As such, in one embodiment, these communications may be carried out by a transmitter and receiver, including an antenna, that is separate from all of the other communications transmitted and received by the aircraft. In other embodiments, the communications between the aircraft and the remote location may be carried out by the communication link(s) that are shared with other communications transmitted and received by the aircraft. In this embodiment, the signals related to the automatic control system may have a higher priority than the other signals carried by the communication link(s). Prioritization of communication signals, particularly in the case of aircraft communication signals, is discussed in detail in U.S. Pat. No. 6,747,577, the disclosure of which is incorporated by reference herein in its entirety.

The automatic control processor 20 may also receive commands for controlling the operation of the aircraft in any manner known to those skilled in the art. When the automatic control system is not engaged, then the automatic control processor 20 typically receives commands for controlling the operation of the aircraft from the onboard controls 24. When the automatic control system is engaged, however, the onboard controls 24 are disabled as described above, and the commands for controlling the operation of the aircraft are supplied from alternative sources. For example, flight control commands 46 may be transmitted to the automatic control processor 20 from at least one remote location via a communication link, as described above. Thus, because the aircraft is in communication with the remote location, personnel and/or equipment at the remote location may transmit flight control commands to the automatic control processor 20. Alternatively or in addition to control commands from a remote location, predetermined flight control commands may be stored onboard the aircraft, such as in a storage element 48. Furthermore, the flight control commands may be generated by guidance software onboard the aircraft or at a remote location that determines autonomous waypoints using a global positioning system or an inertial navigation system. For instance, in one embodiment of the automatic control system employed onboard an aircraft, at least a portion of the flight control commands may be generated by a guidance system 56 of the aircraft's autopilot system.

The automatic control processor 20 then transmits the flight control commands received from the remote location and/or the onboard storage element to the appropriate control component. For instance, flight control commands for an aircraft may include but are not limited to commands for navigating the aircraft away from populated areas, flying the aircraft in a holding pattern, and automatically landing the aircraft at a predetermined location, such as a military landing site.

Alerts of varying context and priority level can be sent via satellite to a ground monitoring station if any of the following events occurred: (a) Utilizing face recognition incorporated into the eye tracker video feed. If the system detects that both pilots' seats are vacant, or occupied by someone the system does not recognize. (b) If the aircraft strays outside of a geographic fence, or outside of nominal flight parameters. (c) If the system detects elevated fatigue readings. (d) If the pilot's instrument scan does not conform with baseline expectations.

An alert might comprise one or more of the following: (a) A snapshot of instrument scan performance data to characterize the breakdown in performance. The ground-based staff could use the replay tool utilized in training to visualize the instrument scan and flight deck interaction in the same way that this is undertaken in training. (b) A video feed from the eye tracker camera to provide insight into pilot health/identification. (c) A snapshot of flight performance data (snapshot of aircraft profile) over a period of time. This could also be replayed in the performance evaluation tool for evaluation. (d) Face recognition data with picture/video. (e) Fatigue measurements.

In accordance with a further enhancement, an additional data recorder (i.e., storage device) can be introduced into an aircraft that also receives the "black box" data, including any additional eye tracking performance and fatigue data (set forth in more detail above), over the duration of each flight and then downloads that data to the PMCC after each flight for analysis. This is expected to: provide airlines with more insight into how effectively fatigue is being mitigated through scheduling; provide airlines with up-to-date fatigue measures for pilots being considered for scheduling changes; deliver pilot instrument scan and flight deck interaction behavior recorded throughout the flight to the pilot performance data repository. This serves to better inform engineers about how pilots from different regions and with different experience levels fly aircraft made by a particular manufacturer.

Currently there is no way for airlines to monitor their pilots' performance and determine actual levels of fatigue. There is no way to collect real data that provides insight into how pilots actually fly their aircraft, except for limited studies in simulators, which is somewhat biased data due to the elevated state of active participation from pilots. The PMCC would analyze pilot fatigue data after each flight and pass on details to the airline control centers to better inform schedulers of the current fatigue state of their pilots. Other data analytics could be undertaken to help optimize scheduling to better mitigate fatigue. The performance analysis tool provides a real-time quantitative measure of fatigue for the individual, rather than generating a score that utilizes a generalized formula.

The acquired data can be analyzed by the ground-based PMCC to look for individual and general deficiencies in pilot performance. These findings could be evaluated with the airline to determine if/where there are deficiencies in the training curriculum. In effect, the analysis would serve as an assessment of training effectiveness while identifying skill/procedural problems with individual pilots that may not become apparent in the limited scenarios that are worked through during a periodic assessment.

In addition to performance data indicative of fatigue, the data downloaded to the pilot performance data repository may include data that will enable an airline to better evaluate its pilot training effectiveness and gain better insight into individual pilot performance. Airlines currently rely on the results from recurrent assessments to ensure that pilots are performing at an adequate level of proficiency. The pilot performance data repository will enable the PMCC staff to analyze instrument scan behavior, flight deck interaction, and related aircraft profile data across different phases of flight and discrete activities for an individual pilot or a group of pilots. When investigating training effectiveness, the performance analysis tool will allow the analyst to group and filter data from the airline pilots in order to consider how pilots are flying aircraft relative to the current or a modified training curriculum. The data will also allow airlines to evaluate how each individual pilot is performing during normal operations, rather than in canned training environments, where scenarios can often be known or expected. This method takes the subjectivity out of evaluating training effectiveness, while mitigating any potential bias introduced when evaluations occur in a training environment. Objective pilot performance data enables a more robust foundation of data to inform training effectiveness and pilot competency reviews.

The system also monitors pilot manipulation of the flight deck instruments via the changing state of instrument variables. The system then evaluates that activity relative to the current context, baseline performance database, and system parameters. For example, the baseline database may hold expectations regarding when the pilot should initiate an action by reconfiguring the autopilot. The system can then determine if that action happened within an acceptable amount of time relative to the baseline. Other pilot actions that may be evaluated relative to system parameters might be when the pilot adjusts the yoke controller to correct the aircraft's attitude during IFR or VFR conditions to maintain required flight path. Parameters detailing the thresholds of the aircraft's expected profile at any point in time across a flight plan would indicate a possible deviation from appropriate behavior.

Figure 9:
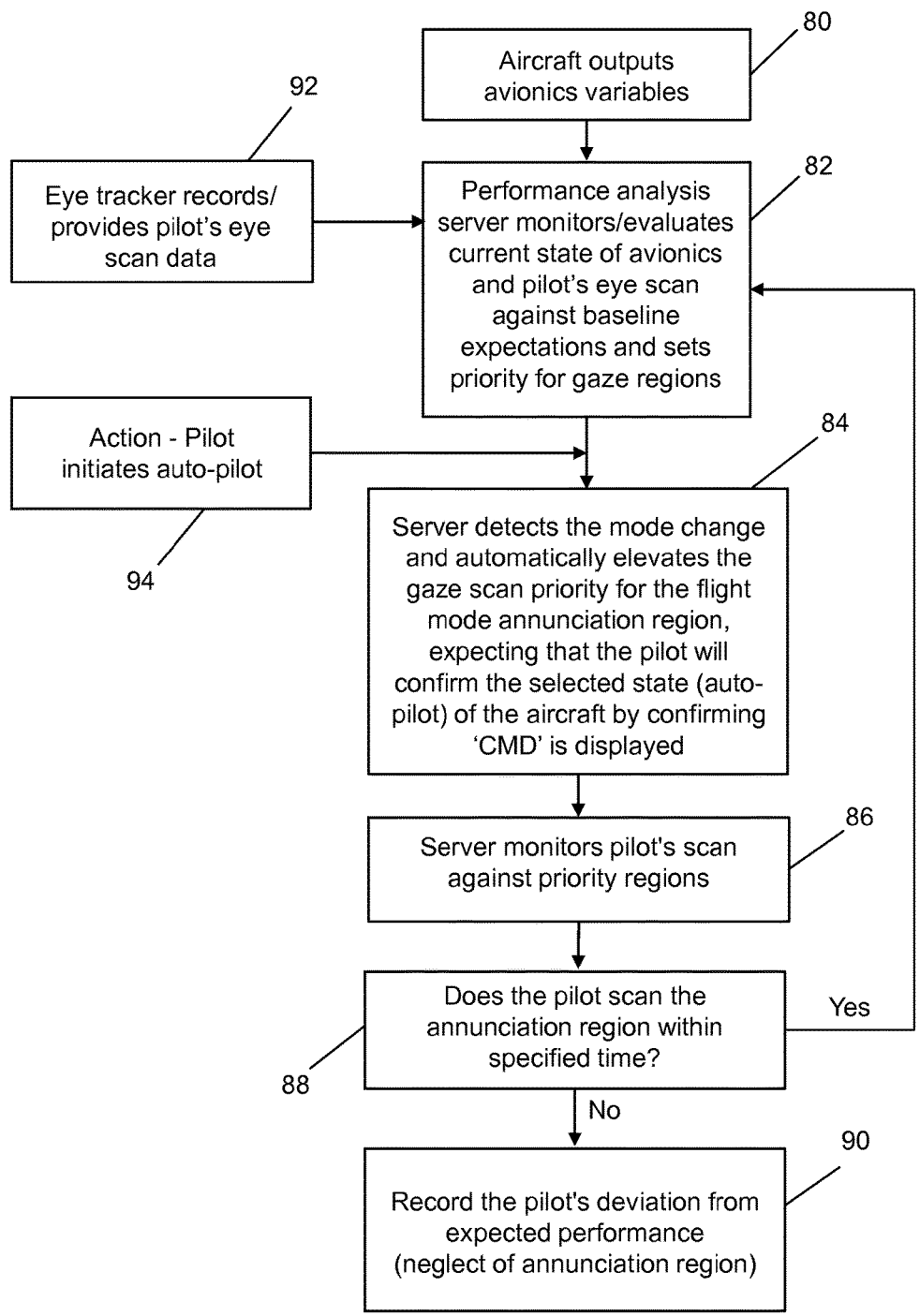
FIG. 9 is a flowchart identifying steps of a method for in-flight monitoring of pilot performance in real-time.

To illustrate this aspect, one example will be described in detail with reference to FIG. 9. During each flight, data representing the pilot's instrument scan behavior can be evaluated in real time by a performance analysis server. The performance analysis server may be located onboard the aircraft or on the ground. In the latter case, the data is downloaded in real time from the aircraft to the ground. During the flight, the aircraft outputs avionics variables to the performance analysis server (step 80). Concurrently the eye tracker records and outputs the pilot's eye scan data to the performance analysis server (step 92). The performance analysis server monitors and evaluates the current state of the avionics and the pilot's eye scan behavior against baseline expectations and sets priority for gaze regions (step 82). If the pilot acts, e.g., by initiating the autopilot (step 94), the performance analysis server detects the mode change and automatically elevates the gaze scan priority for the flight mode annunciation region, expecting that the pilot will confirm the selected state (autopilot) of the aircraft by confirming that "CMD" is displayed (step 84). The performance analysis server then monitors the pilot's gaze scan with respect to the priority regions (step 86). A determination is then made whether the pilot scans the annunciation region within a specified time or not (step 88). If the pilot does scan the annunciation region within the specified time, the process returns to step 82. If the pilot does not scan the annunciation region within the specified time, the pilot's deviation from expected performance (neglect of annunciation region) is recorded.

The capabilities of the eye tracking and data handling components described above can also be applied within air traffic management (ATM) training and operational environments. The operational application of the technology would incorporate real-time monitoring of ATM operator health and performance in a manner similar to the real-time monitoring of pilot performance described above.

Figure 10:
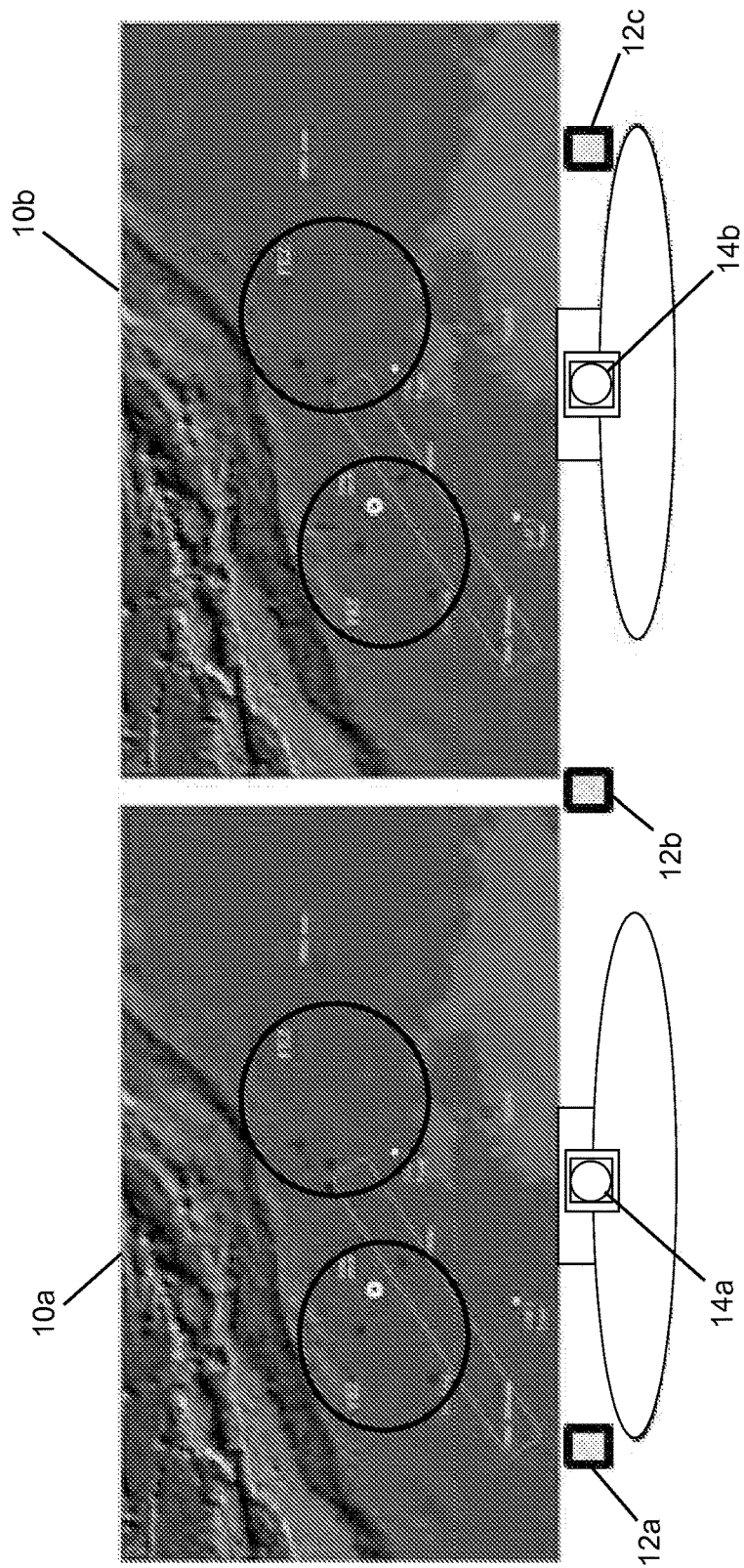
FIG. 10 is a diagram showing a pair of air traffic management consoles equipped with cameras and infrared light sources.

FIG. 10 shows a pair of ATM consoles 10a and 10b equipped with three infrared light sources 12a-12c and two cameras 14a and 14b. A processor (not shown in FIG. 10) can be programmed with eye tracking software that measures each ATM operator's gaze direction, pupil diameter and blink reflex based on the image data acquired by the cameras 14a and 14b. The processor may comprise a performance analysis server that is programmed to assess the performance of each ATM operator based on the image data.

ATM operators are expected to periodically attend to certain high-priority information that is presented on their consoles. High-priority information refers to regions within the ATM display which require priority attention from the operator due to a particular event, workflow, or incident. It might include the monitoring/vectoring of aircraft that are in close proximity on the geographic display in order to ensure their separation. It could refer to attending to text alerts of certain relative priority. For military application, controllers are required to vector friendly aircraft into battle and provide tactical advantage. To successfully achieve that aim, controllers must maintain awareness of factors that influence their decision making. This information is presented within different regions of the display and require monitoring to a varying degree based on the priority of the information relative to the current situation. The performance analysis server can monitor the relevance and priority of information and consider the allocated visual attention of the ATM operator in real time.

The ability for an ATM operator to identify and visually scan such information is fundamental to ensuring successful performance. The inability of ATM instructors and supervisors to accurately determine how the ATM operator is allocating his/her attention complicates identifying the root cause of performance breakdowns during training and applied operation. ATM operators are subjected to periods of extremely high workload, stress, and fatigue, which may not be easy for an ATM supervisor to detect and help mitigate until issues arise.

Similar to aviation, the ATM instructor must make a deductive causal inference. This inference is based on the observed effects of a breakdown in the ATM's operator's information processing, along with a consideration of how the operator is interacting with the console. Some instructors might use cues, such as the mouse cursor position, to infer visual attention, which can be extremely misleading or at best superficial.

The eye tracking and data handling technology described herein allows one to develop ATM instructor tablet PC interfaces that enable ATM instructors to observe in real time how the students are visually attending to the ATM information. Automated analysis functionality can be developed that determines breakdowns in operator performance by identifying regions within the ATM operator's console display where the ATM operator is neglecting or fixating on information.

One example of such automated analysis functionality would be that the performance analysis server be programmed to monitor the arrival time and priority of alerts at the ATM console, along with the frequency in which the ATM operator visually attends to the information. The alert region may vary in its priority due to the nature of any activity or current situation. This will influence the expected frequency of attention being allocated by the ATM operator. The assessment of allocated attention within each region relative to its current priority can be automated. The ATM instructor would be alerted when the ATM operator appears to be neglecting or fixating on a region.

Another example is that ATMs, both military and civilian, have responsibility for monitoring all traffic in their allocated region of airspace. The performance analysis server can be programmed to assess an ATM operator's performance regarding the frequency with which that operator visually attends to current air traffic, and how effectively he/she performs broader visual search scans within their region of responsibility. A summary of performance results can then be presented to the ATM instructor that characterizes the level of attendance that the ATM operator is allocating to his/her area of responsibility.

The PMCC can monitor ATM operators' health and performance. Information received from the ATM facilities could relate to cognitive workload, stress, and fatigue to provide improved awareness of periods when excessive demand is being placed on ATM operators, or when ATM operators may be nonresponsive or compromised. The PMCC staff could also monitor security of ATM operators through face recognition in a similar manner to that which is proposed for pilots above.

While systems and methods have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit) capable of executing instructions.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed partially or wholly concurrently or in an alternative order.

The invention claimed is:

1. A system for identifying a pilot occupying a pilot seat on an aircraft, comprising:
   a database storing files of image data representing respective images of faces of authorized pilots;
   a camera installed on a flight deck such that a field of view of the camera will include a face of a person occupying a pilot seat on the aircraft;
   a first processor programmed to receive image data from said camera representing an image of the face of the person occupying the pilot seat, compare the image data from the camera to the image data in the files of image data stored in the database, and generate either a first signal if the acquired image data matches image data in one of the stored files of image data or a second signal different than the first signal if the acquired image data does not match image data in any one of the stored files of image data;
   a second processor operatively coupled to receive signals from said first processor;
   a pilot flight control which is operable by a pilot to output flight control signals;
   an autopilot system which is activatable by said second processor to output flight control signals;
   a flight control computer programmed to control flight of the aircraft in response to receipt of flight control signals; and
   switches controlled by said second processor, wherein said switches are configured and controlled so that said flight control computer receives flight control signals from said autopilot system and does not receive flight control signals from said pilot flight control in response to receipt of said second signal by said second processor from said first processor.

2. The system as recited in claim 1, wherein said computing device and said database are located onboard the aircraft.

3. The system as recited in claim 1, wherein said computing device and said database are located on the ground.

4. A method for evaluating pilot performance during a first flight of an aircraft, comprising:
   using an eye tracker device, monitoring the pilot's eyes during the first flight;
   measuring a blink reflex of the pilot's eye pupil during the first flight;
   storing blink reflex data in a data storage device onboard the aircraft during the first flight;
   retrieving the stored blink reflex data from the data storage device after the first flight;
   performing a comparative analysis comparing the retrieved pupil diameter data with baseline standard data;
   assessing pilot fatigue based on results of the comparative analysis comparing the retrieved blink reflex with baseline standard data, wherein pilot fatigue is assessed at a pilot monitoring and control center;
   sending results of the assessment of pilot fatigue to a scheduler at an airline control center;
   determining that the pilot is scheduled to pilot a second flight; and
   not allowing the pilot to pilot the second flight if the assessment of pilot fatigue following the first flight indicates that the pilot is too fatigued to safely pilot an aircraft.

5. The method as recited in claim 4, further comprising:
   measuring a pupil diameter of the pilot's eye pupil during the flight;
   storing pupil diameter data in a data storage device onboard the aircraft during the flight;
   retrieving the stored pupil diameter data from the data storage device after the flight;
   performing a comparative analysis comparing the retrieved pupil diameter data with baseline standard data; and
   assessing pilot cognitive workload based on results of the comparative analysis comparing the retrieved pupil diameter data with baseline standard data.

* * * * *